United States Patent
Palanisamy et al.

(10) Patent No.: US 6,772,037 B2
(45) Date of Patent: Aug. 3, 2004

(54) CONSTRAINT BASED MATERIAL TRIMMING CONTROLLER

(75) Inventors: Lingathurai Palanisamy, TamilNadu (IN); Sudarshan Yermal, Karnataka (IN); K.S.T. Vanisri, Karnataka (IN)

(73) Assignee: Honeywell International Inc., Morristown, NJ (US)

( * ) Notice: Subject to any disclaimer, the term of this patent is extended or adjusted under 35 U.S.C. 154(b) by 56 days.

(21) Appl. No.: 10/305,837

(22) Filed: Nov. 26, 2002

(65) Prior Publication Data

US 2004/0102867 A1 May 27, 2004

(51) Int. Cl.[7] .......................... G05B 13/02; G06F 7/66; G06F 15/18; G06F 19/00
(52) U.S. Cl. ...................... 700/127; 700/50; 700/171; 706/19; 706/925
(58) Field of Search ..................... 700/50, 127, 128, 700/171; 706/19, 45, 904, 925

(56) References Cited

U.S. PATENT DOCUMENTS

| | | | |
|---|---|---|---|
| 4,221,974 A | * 9/1980 | Mueller et al. | 250/559.48 |
| 5,815,398 A | * 9/1998 | Dighe et al. | 700/217 |
| 6,502,489 B2 | * 1/2003 | Gerent et al. | 83/49 |
| 2002/0022904 A1 | * 2/2002 | Hoffman | 700/171 |
| 2004/0019401 A1 | * 1/2004 | Bush et al. | 700/127 |

* cited by examiner

Primary Examiner—Leo Picard
Assistant Examiner—Elliot Frank
(74) Attorney, Agent, or Firm—Kris T. Fredrick

(57) ABSTRACT

A pattern solution set for paper roll trimming to fulfill orders is generated using constraint programming and a heuristic. For every pattern generated, an objective function is evaluated based on the sum of waste factor and the variance of the quantity ordered for all widths in that pattern. The pattern that has the least objective function is chosen with the maximum number of sets possible. Orders are updated with the quantities left over and then the process continues, forming a solution tree, which serves as an initial solution set. The initial solution set is checked individually against the average loss of the solution set. Nodes in the solution tree having trim loss greater than the average loss are identified. Branches of the tree emanating from its parent are explored for better patterns. The process continues until all patterns are below the initial average loss.

25 Claims, 2 Drawing Sheets

CONSTRAINT BASED MATERIAL TRIMMING CONTROLLER

FIELD OF THE INVENTION

The present invention relates to trimming materials, and in particular to a constraint based paper reel trimming controller.

BACKGROUND OF THE INVENTION

Planning production and distribution of paper products in real world manufacturing environments is an extremely complex task. Hundreds of constraints and business objectives need to be considered. In the paper and pulp industry, planning is required for trimming huge paper rolls into different width, based on requirements and machine constraints.

In operation, a paper machine produces large rolls of paper, called reels. The width of the reel is referred to as the deckle, and is normally fixed for each machine. Another machine, referred to as the winder, cuts the reels into rolls of smaller diameter and width. The process of trimming a reel to make rolls is called trimming.

Several sets of rolls are made from each reel. The widths and diameter of these rolls must match customer requirements as represented by customer orders. Sometimes a manufacturer may produce more or less (within specified tolerance) than an ordered amount. The amount produced in excess of the order quantity is a called overrun. Production shortfalls are called underruns.

Trimming is a classical combinatorial optimization problem, which finds out how to combine various customer orders on a winder machine of the same product type to achieve certain objectives, such as minimization of wastage and limiting the amount of overrun and underrun. A pattern for trimming is simply a combination of different roll widths that sum up to a given deckle size. Selecting the pattern for trimming is typically an integer programming problem. The number of variables used is proportional to the number of orders. As a result, it is computationally intensive. An alternative way to provide solutions is to use dynamic column generation and relaxation methods.

SUMMARY OF THE INVENTION

A pattern solution set for material trimming to fulfill orders is generated using constraint programming and a heuristic. In one embodiment, the material comprises a paper reel that is to be divided into different width rolls. For every pattern generated, an objective function is evaluated based on the sum of waste factor and the variance of the quantity ordered for all widths in that pattern. The pattern that has the least objective function is chosen with the maximum number of sets possible. Orders are updated with the quantities left over and then the process continues, forming a solution tree, which serves as an initial solution set.

In one embodiment, the initial solution set is checked individually against the average loss of the solution set. Nodes in the solution tree having trim loss greater than the average loss are identified. Branches of the tree emanating from its parent are explored for better patterns considering overrun/underrun tolerances given by the customer for orders to yield multiple solutions. The process continues until all patterns are below the initial average loss.

DETAILED DESCRIPTION OF THE INVENTION

In the following description, reference is made to the accompanying drawings that form a part hereof, and in which is shown by way of illustration specific embodiments in which the invention may be practiced. These embodiments are described in sufficient detail to enable those skilled in the art to practice the invention, and it is to be understood that other embodiments may be utilized and that structural, logical and electrical changes may be made without departing from the scope of the present invention. The following description is, therefore, not to be taken in a limited sense, and the scope of the present invention is defined by the appended claims.

The functions or algorithms described herein are implemented in software in one embodiment, where the software comprises computer executable instructions stored on computer readable media such as memory or other type of storage devices. The term "computer readable media" is also used to represent carrier waves on which the software is transmitted. Further, such functions correspond to modules, which are software, hardware, firmware of any combination thereof. Multiple functions are performed in one or more modules as desired, and the embodiments described are merely examples. The software is executed on a digital signal processor, ASIC, microprocessor, or other type of processor operating on a computer system, such as a personal computer, server or other computer system.

Figure 1:
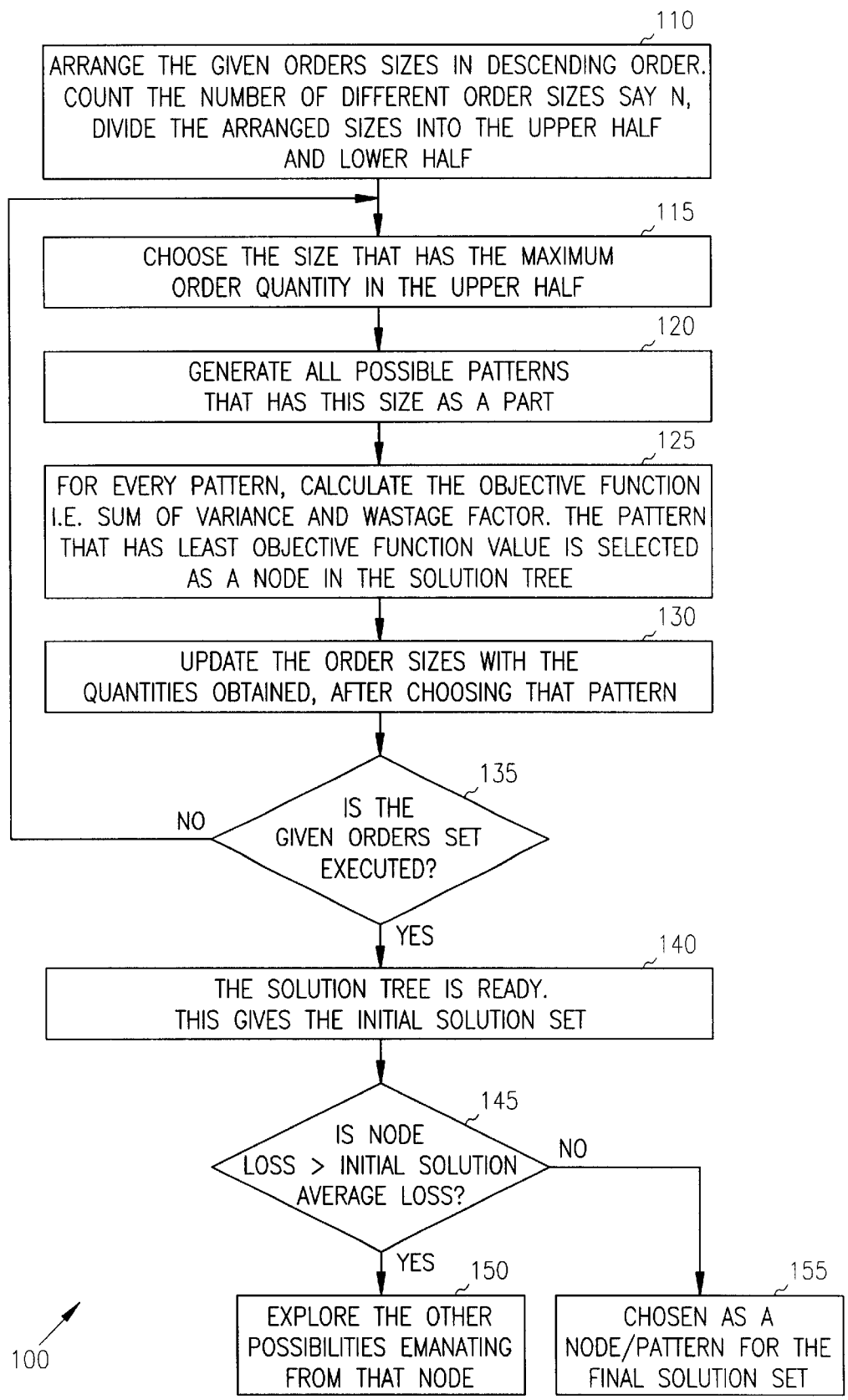
FIG. 1 is a flowchart of a paper roll trimming algorithm.

An algorithm for generating a pattern solution set for paper roll trimming to fulfill orders is shown in flowchart form in FIG. 1 at 100. Orders are received from customers for rolls of paper that must be cut or trimmed from reels having a width referred to as a deckle. The paper roll trimming algorithm is used to determine how to cut the reels to satisfy the orders in an optimal or close to optimal solution. Each roll ends up being cut in accordance with a pattern for that roll. The algorithm provides the patterns.

At 110, multiple orders from a customer or customers are arranged in sizes defined by the width of the end product desired. It will take up all the orders that are in a single group formed by a scheduler algorithm. The order is provided in descending order in one embodiment. The number of different order sizes is counted and defined as n. The ordered sizes are then divided into an upper half and a lower half. At 115, the size that has the maximum ordered quantity is selected from the upper half, and all possible patterns that have this size as a part are generated at 120. At 125, for every pattern generated, an objective function is calculated. In one embodiment, the objective function is the sum of the variance and a wastage factor which are calculated in one embodiment as follows:

$$VarianceFactor = \left[\frac{MaximumQuantity required - MinimumQuantityRequired}{2 * MaximumQuantity required}\right]$$

$$WastageFactor = \left[\frac{PerPatternloss * possiblenumberofsets}{maximumlosspossible * maximumquantity}\right]$$

Objective Function=Varinace Factor+Wastage factor

The pattern that has the least objective function value is selected as a node in a solution tree.

At 130, order sizes are updated with new quantities obtained after choosing the pattern. If the given orders set is not executed at 135, processing returns to 115 to select the size that has the maximum ordered quantity in the upper half. If no more order is left out for trimming at 135, the solution tree is complete, and is provided as an initial solution set at 140.

At 145, a determination is made as to whether the node loss is greater than an initial average loss of the solution set. If the loss is greater, other possibilities emanating from the node are considered. If not, the node/pattern is selected for a final solution set.

In one example, the algorithm provides the following results given a deckle size of 155 cm and the following set of orders:

| Order size | Quantity (Rolls) | Overrun | Under-run |
|---|---|---|---|
| 85 | 40 | 4 | 4 |
| 69 | 9 | 0 | 0 |
| 87 | 20 | 2 | 2 |
| 64 | 20 | 2 | 2 |
| 60 | 19 | 1 | 1 |
| 31.5 | 44 | 4 | 4 |

In Step 1, the order sizes are first ranked. This results in the following order ranking:

87, 85, 69, 64, 60, 31.5

The number of orders, n, is 6.

The upper half consists of orders having sizes 87, 85, and 69, and the lower half consists of sizes 64, 60, and 31.5.

In Step 2, the order size 85 is identified as having the maximum quantity to be made, i.e., 40 in the upper half. Next, at Step 3, patterns are generated that contain the size 85, yet can still be cut from a reel having a deckle of 155:

85, 69
85, 64
85, 60 and
85, 31.5, 31.5

Next, a waste factor, variance and an objective function, which in one embodiment is the sum of the waste factor and variance is calculated for each pattern in Step 4.

| Patterns | Waste Factor | Variance | Objective Function |
|---|---|---|---|
| 85, 69 | 0.013196481 | 0.3875 | 0.400696 |
| 85, 64 | 0.225806452 | 0.225 | 0.450806 |
| 85, 60 | 0.175953079 | 0.25 | 0.425953 |
| 85, 31.5, 31.5 | 0.278592375 | 0.2625 | 0.541092 |

Pattern 85, 69 is chosen because it has the lowest objective function. The possible number of sets to be made is nine because order size 69 only requires 9 rolls. That leaves the following rolls defined in Step 5 left to be made after the 9 rolls are processed:

| Order size | Quantity (Rolls) |
|---|---|
| 85 | 31 |
| 69 | 0 |
| 87 | 20 |
| 64 | 20 |
| 60 | 19 |
| 31.5 | 44 |

In Step 6, since there are still orders to be processed, the above procedure is repeated from Steps 2, with updated orders available from Step 5, resulting in the following patterns and sets being identified at Step 7:

| Patterns | Sets | Wastage |
|---|---|---|
| 85, 69 | 9 | 1 * 9 |
| 85, 64 | 20 | 6 * 20 |
| 87, 31.5, 31.5 | 20 | 5 * 20 |
| 85, 60 | 11 | 10 * 11 |
| 60, 60, 31.5 | 4 | 3.5 * 4 |
| | Total Waste: | 353 |

The average trim loss is 5.51. The patterns chosen for the last set are:

85, 69
87, 31.5, 31.5
60, 60, 31.5

Two sets, 85, 64 and 85,60 are eliminated and the updated order set is created. Now the process is repeated from Step 2 with the given underrun and overrun flexibilities provided by order tolerances.

Figure 2:
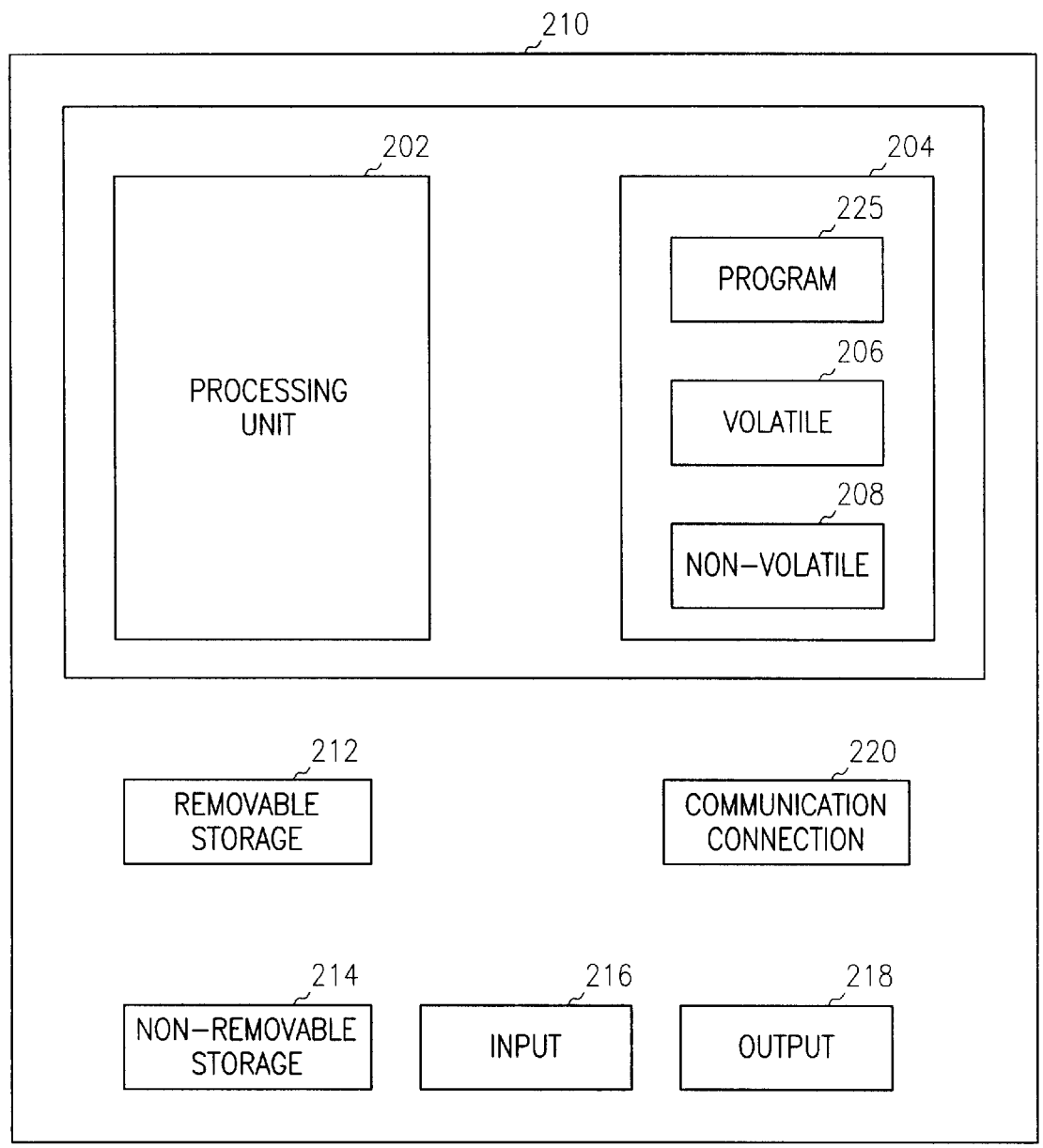
FIG. 2 is a block diagram of a computer system implementing the flowchart of FIG. 1.

A block diagram of a computer system that executes programming for performing the above algorithm is shown in FIG. 2. A general computing device in the form of a computer 210, may include a processing unit 202, memory 204, removable storage 212, and non-removable storage 214. Memory 204 may include volatile memory 206 and non-volatile memory 208. Computer 210 may include—or have access to a computing environment that includes—a variety of computer-readable media, such as volatile memory 206 and non-volatile memory 208, removable storage 212 and non-removable storage 214. Computer storage includes RAM, ROM, EPROM & EEPROM, flash memory or other memory technologies, CD ROM, Digital Versatile Disks (DVD) or other optical disk storage, magnetic cassettes, magnetic tape, magnetic disk storage or other magnetic storage devices, or any other medium capable of storing computer-readable instructions. Computer 210 may include or have access to a computing environment that includes input 216, output 218, and a communication connection 220. The computer may operate in a networked environment using a communication connection to connect to one or more remote computers. The remote computer may include a personal computer, server, router, network PC, a peer device or other common network node, or the like. The communication connection may include a Local Area Network (LAN), a Wide Area Network (WAN) or other networks.

Computer-readable instructions stored on a computer-readable medium are executable by the processing unit 202 of the computer 210. A hard drive, CD-ROM, and RAM are some examples of articles including a computer-readable medium. For example, a computer program 225 capable of providing a generic technique to perform access control check for data access and/or for doing an operation on one of the servers in a COM based system according to the teachings of the present invention may be included on a CD-ROM and loaded from the CD-ROM to a hard drive. The computer-readable instructions allow computer system 200 to provide generic access controls in a COM based computer network system having multiple users and servers.

Conclusion

A pattern solution set for paper roll trimming to fulfill orders is generated using constraint programming and a heuristic. For every pattern generated, an objective function is evaluated based on the sum of waste factor and the variance of the quantity ordered for all widths in that pattern. Other objective functions related to waste and variance or other similar statistical measure may be used in further embodiments. The pattern that has the least objective function is chosen with the maximum number of sets possible. Orders are updated with the quantities left over and then the process continues, forming a solution tree, which serves as an initial solution set.

In one embodiment, the initial solution set is checked individually against the average loss of the solution set. Nodes in the solution tree having trim loss greater than the average loss are identified. Branches of the tree emanating from its parent are explored for better patterns considering overrun/underrun tolerances given by the customer for orders to yield multiple solutions. The process continues until substantially all patterns are below the initial average loss.

The process is also applicable to other similar problems, such as the trimming or dividing of other raw materials, such as pipes, trees, and other materials that come in a standard length or other unit of measure that needs to be divided into smaller units.

What is claimed is:

1. A computer implemented method of determining how to cut materials to satisfy orders, the method comprising:
   sorting orders by size of material in each order into upper and lower parts;
   forming a solution tree having multiple nodes from an upper part of the divided orders;
   exploring other possibilities from a node if the node loss is greater than an average loss; and
   selecting a pattern corresponding to the node if the node loss is not greater than an average loss.

2. The method of claim 1 wherein the materials comprise reels of paper that are to be cut into rolls to satisfy the orders.

3. The method of claim 2 wherein the upper part and lower part correspond respectively to an upper half and a lower half.

4. The method of claim 3 wherein the element of forming a solution tree comprises:
   selecting a size in the upper half that has the maximum quantity ordered;
   generating all possible patterns that has this size as a part;
   for every pattern, calculating an objective function;
   selecting the pattern that has the lowest objective function value as a node in the tree;
   updating the order sizes after subtracting out those satisfied by the selected pattern; and
   repeating the above steps to identify further nodes in the tree.

5. The method of claim 4 wherein the objective function comprises a sum of the variance and a wastage factor for a pattern.

6. A computer implemented method of determining how to cut materials to satisfy orders, the method comprising:
   sorting orders by size of material in each order;
   selecting a size in an upper division of the orders that has a high quantity;
   generating patterns that include the size;
   determining a value of a function representative of wastage;
   selecting a pattern that has the lowest wastage function value as a node in a solution tree;
   updating the order sizes after choosing the pattern and repeating until all orders are processed;
   exploring other possibilities from a node if the node loss is greater than an average loss; and
   selecting a pattern corresponding to the node if the node loss is not greater than an average loss.

7. The method of claim 6 wherein the function representative of wastage comprises a variance and a wastage factor.

8. The method of claim 6 and further comprising counting the number of different order sizes.

9. The method of claim 6 wherein the upper division comprises an upper half of the divided orders.

10. The method of claim 6 wherein the materials comprise reels of paper that are to be cut into rolls to satisfy the orders.

11. A computer implemented method of determining how to cut materials to satisfy orders, the method comprising:
    sorting orders by size of material in each order;
    selecting a size in an upper division of the orders that has a high quantity;
    generating patterns that include the size;
    determining a value of a function representative of wastage;
    selecting a pattern that has the lowest wastage function value as a node in a solution tree;
    updating the order sizes after choosing the pattern and repeating until all orders are processed to provide an initial solution set in the form of a solution tree.

12. The method of claim 11 wherein the function representative of wastage comprises a variance and a wastage factor.

13. The method of claim 11 and further comprising counting the number of different order sizes.

14. The method of claim 11 wherein the upper division comprises an upper half of the divided orders.

15. The method of claim 11 wherein the materials comprise reels of paper that are to be cut into rolls to satisfy the orders.

16. A computer readable medium having instructions for causing a computer to implement a method of determining how to divide materials to satisfy orders, the method comprising:
    dividing orders by size of material in each order into upper and lower parts;

forming a solution tree having multiple nodes from an upper part of the divided orders;

exploring other possibilities from a node if the node loss is greater than an average loss; and selecting a pattern corresponding to the node if the node loss is not greater than an average loss.

17. The computer readable medium of claim 16 wherein the materials comprise reels of paper that are to be cut into rolls to satisfy the orders.

18. The computer readable medium of claim 17 wherein the upper part and lower part correspond respectively to an upper half and a lower half.

19. The computer readable medium of claim 18 wherein the element of forming a solution tree comprises:

selecting a size in the upper half that has the maximum quantity ordered;

generating all possible patterns that has this size as a part;

for every pattern, calculating an objective function;

selecting the pattern that has the lowest objective function value as a node in the tree;

updating the order sizes after subtracting out those satisfied by the selected pattern; and repeating the above steps to identify further nodes in the tree.

20. The computer readable medium of claim 19 wherein the objective function comprises a sum of the variance and a wastage factor for a pattern.

21. A controller that determines how to divide materials to satisfy orders, the controller comprising:

means for dividing orders by size of material in each order into upper and lower parts;

means for forming a solution tree having multiple nodes from an upper part of the divided orders;

means for exploring other possibilities from a node if the node loss is greater than an average loss; and means for selecting a pattern corresponding to the node if the node loss is not greater than an average loss.

22. The controller of claim 21 wherein the materials comprise reels of paper that are to be cut into rolls to satisfy the orders.

23. The controller of claim 22 wherein the upper part and lower part correspond respectively to an upper half and a lower half.

24. The controller of claim 23 wherein the means for forming a solution tree comprises:

a modules that selects a size in the upper half that has the maximum quantity ordered;

a module that generates all possible patterns that has this size as a part;

a module that calculates an objective function for every pattern;

a module that selects the pattern that has the lowest objective function value as a node in the tree; and a module that updates the order sizes after subtracting out those satisfied by the selected pattern.

25. The controller of claim 24 wherein the objective function comprises a sum of the variance and a wastage factor for a pattern.

* * * * *